United States Patent

[11] 3,633,951

[72] Inventors Ewan M. Hinkle
Laguna Niguel;
Robert A. Hoegee, Huntington Beach, both of Calif.
[21] Appl. No. 16,139
[22] Filed Mar. 3, 1970
[45] Patented Jan. 11, 1972
[73] Assignee Shur-Lok Corporation
Santa Ana, Calif.
Continuation-in-part of application Ser. No. 834,345, June 18, 1969. This application Mar. 3, 1970, Ser. No. 16,139

[54] ROD END COUPLING WITH DOUBLE HELIX INTERLOCK
9 Claims, 7 Drawing Figs.

[52] U.S. Cl. ..................................................... 287/60, 29/175
[51] Int. Cl. ........................................................ F16b 7/06
[50] Field of Search .......................................... 287/59, 60, 61, 62, 118, 109, 125; 29/175, 516, 517

[56] References Cited
UNITED STATES PATENTS

| | | | |
|---|---|---|---|
| 587,695 | 8/1897 | Billing et al. ................... | 29/516 UX |
| 1,823,158 | 9/1931 | Mogford et al. ............... | 287/109 X |
| 2,046,504 | 7/1936 | Cooper ........................... | 29/517 UX |
| 2,596,885 | 5/1952 | Booth ............................. | 287/125 |
| 2,685,467 | 8/1954 | Booth ............................. | 287/109 X |
| 2,860,898 | 11/1958 | Dooley, Jr. ..................... | 287/61 |
| 3,065,983 | 11/1962 | Flumerfelt ...................... | 287/60 |
| 3,239,930 | 3/1966 | Violleau ......................... | 287/60 X |
| 3,371,572 | 3/1968 | King, Jr. ......................... | 29/517 X |

FOREIGN PATENTS 232,328   4/1925   Great Britain

*Primary Examiner*—Andrew V. Kundrat
*Attorney*—Lynn H. Latta

ABSTRACT: A rod end is anchored in a tube end by swaging the tube end around a hardened internally threaded reinforcing sleeve having crossed helical grooves or annular grooves crossed by a longitudinal groove or grooves, into which the tube is extruded, thus locking the sleeve to the tube against both axial and rotational displacement.

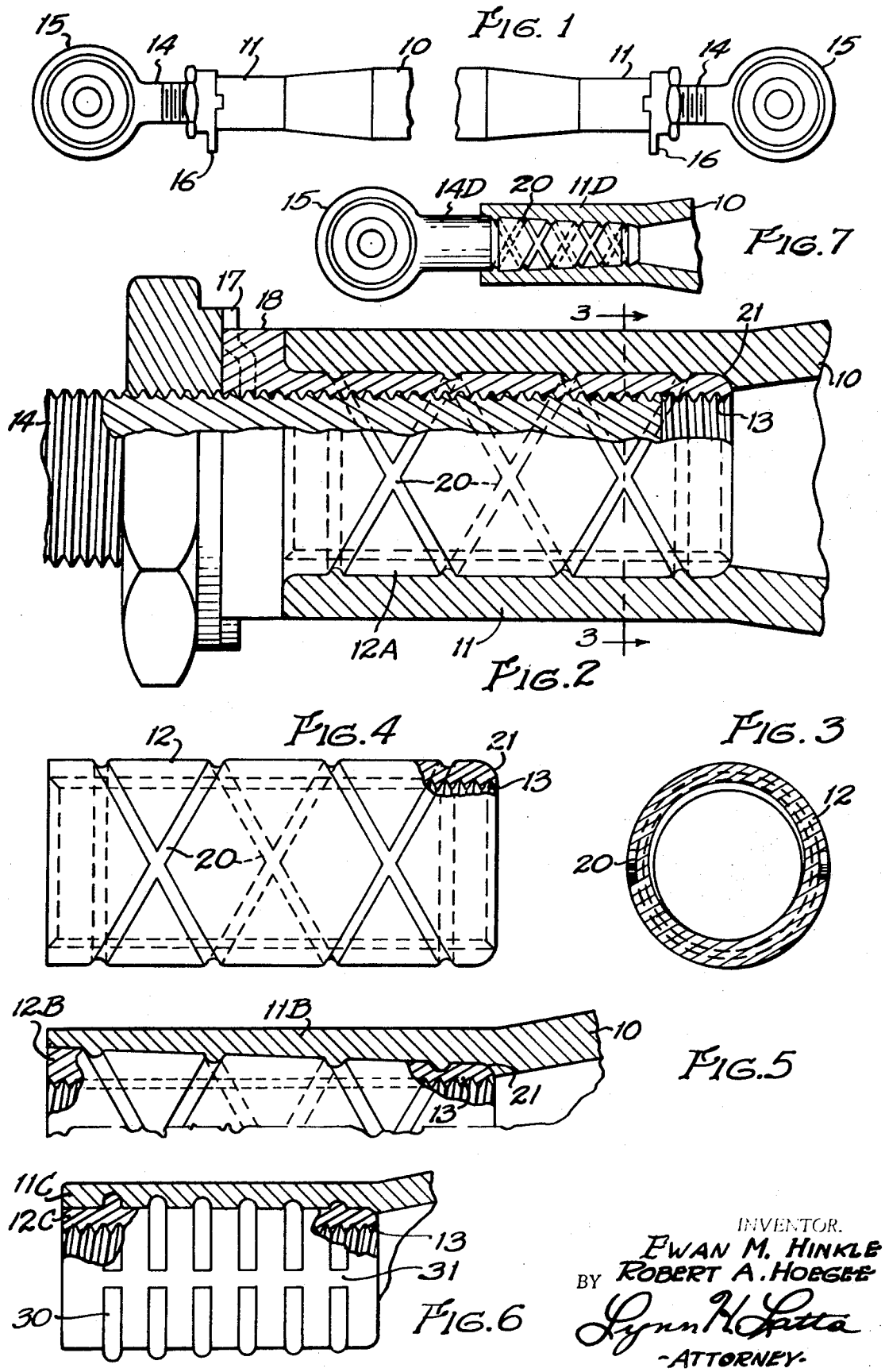

ROD END COUPLING WITH DOUBLE HELIX INTERLOCK

RELATED APPLICATION

This application is a continuation-in-part of our application Ser. No. 834,345, filed June 18, 1969, for Swaged Rod End to Tube End Coupling and Method of Fabricating the Same.

BACKGROUND OF THE INVENTION

It has heretofore been proposed, according to Voilleau U.S. Pat. No. 3,239,930, to swage a tube end over an externally threaded mandrel and then to remove the mandrel so as to provide an internally threaded tube end into which a rod end can be threaded. A reinforcing ring or collar is swaged around the tube end. Anderson U.S. Pat. No. 1,502,133, also discloses the pressing of a reinforcing collar around an internally threaded tube end (e.g., of a turnbuckle or clevis) formed from a stamped sheet metal blank curled into cylindrical configuration. Sperry U.S. Pat. No. 2,488,566 discloses a pull rod having an insert sleeve provided with an internal thread by swaging it around a male thread on a mandrel. Sellers U.S. Pat. No. 236,723, also discloses a forged female thread, in a turnbuckle nut.

The end result in each of the foregoing devices is a coupling resistant to axial separation but not to relative rotary movement.

SUMMARY OF THE INVENTION

In the coupling of this invention, the tube end is locked to the sleeve or rod end around which it is swaged, so as to resist both axial separation and relative rotary movement. Annular jaws, swaged into the throat of the tube end, are locked in crossed helical grooves in the external surface of the sleeve. The sleeve, which is of harder metal than the tube, provides in the tube end a threaded throat of greater strength than can be provided by threads in the rod end itself. The swaging of the tube end into the exterior surface of the sleeve strengthens the wall structure of the tube end and avoids loss of strength which would occur if threads were cut into the internal surface of the tube end.

With the foregoing in mind, the invention has as its general object to provide an improved lightweight, high-strength coupling between a rod end and a tube end; suitable for control rod or pushrod assemblies and other analogous applications in which axial tension or compression loads are transmitted through the coupling. Specific objects are to provide such a coupling;

1. wherein the tube end is swaged around the part to which it is coupled, with high-tension axial load and torque load strength characteristics:

2. wherein reinforcement may be added by swaging the tube end around a hardened liner or insert sleeve having female threads for threaded coupling to the shank of a rod end fitting, especially where axial adjustment by threading action is required, as in a turnbuckle;

3. wherein the insert sleeve has an external configuration along its length, such as to develop in the tube end, in the swaging operation, a longitudinally tapered cross section such as to increase fatigue resistance in the tube end at the inner end of the insert sleeve, where failure most often occurs.

BRIEF DESCRIPTION OF THE DRAWING

These and other objects will become apparent in the ensuing specification and appended drawing, wherein:

FIG. 1 is a fragmentary side view of a pushrod assembly embodying the invention;

FIG. 2 is a view, partially in axial section, of one of the couplings of such an assembly;

FIG. 3 is a cross-sectional view of the sleeve taken on line 3—3 of FIG. 2;

FIG. 4 is a view, partially in axial section, of a modified form of the coupling sleeve;

FIG. 5 is a fragmentary side view of a further modified form of the sleeve, partially in section;

FIG. 6 is a side view, partially in section, of another modified form; and

FIG. 7 is a view, partially in section, of a modified form of rod assembly.

Referring now to the drawings in detail, we have shown therein, as one form in which the invention may be embodied, a control or structural rod assembly (FIG. 1) comprising a tube 10 having reduced ends (nipples) 11 swaged around respective insert sleeves 12 (FIG. 4) which are internally threaded at 13 to receive rod ends 14 which in this instance are the shanks of banjo fittings 15 having eyes for coupling the rod assembly to other operating parts. Each sleeve 12 is of steel or comparably hard metal for coupling strength, and after the rod end 14 is threaded into it to a suitably adjusted position, it is fixed against rotation relative to the nipple 11 by suitable means such as a locknut and lock collar assembly 16 (FIG. 1) or a spline or key element 17 (FIG. 2). In the latter, the sleeve 12A may have an end flange 18 in which the key element 17 is embedded, but this feature is optional and not an essential element of the invention. As an alternative, the sleeve 12 (FIG. 4) may have a plain unflanged end.

Insert sleeve 12 is provided with crossed helical grooves 20 in its external surface, into which the softer metal of nipple 11 is swaged in an operation in which the nipple 11 is shrunk around the sleeve 12, being work hardened and thereby strengthened in the operation. Although the nipple 11 is thus slightly reduced in diameter, it is not subjected to a loss of material such as would occur if threads were cut directly in its internal surface.

Grooves 20 are of rounded cross section as indicated, thus inhibiting the development of fatigue cracks in the tube end. For the same purpose, the end of sleeve 12 is externally rounded at 21.

Grooves 20 are pitched at angles of approximately 30° each with reference to the major axis of the assembly. Thus the load-holding capacity of the sleeve along the rod axis is somewhat greater than the torque load holding capacity, the axial load requirement being greater than the torque requirement.

The grooves 20 have pitch of opposite hand, i.e., one is of "right-hand" pitch and the other is of "left-hand" pitch, and both of them extend continuously from one end of the sleeve to the other, along helical paths which intersect on both sides of the sleeve to define intersections of X form on the respective sides.

As shown in FIG. 5, another modified form of sleeve 12B may be tapered from maximum wall thickness at its outer end to minimum wall thickness at its rounded inner end 21, its external surface being frustoconical. Such tapered external configuration in sleeve 12B will develop in nipple 11B as the latter is swaged around the sleeve, a cross section of continuously increasing area from its outer end to its junction with the body of tube 10, adjacent the inner end of sleeve 12B, for increased axial load-carrying capability and fatigue strength. This provides a very substantial improvement in a rod end assembly wherein failure most often occurs at the inner end of the tube nipple.

In FIG. 6, a plurality of semicircular ribs 30 arranged in pairs with opposed extremities spaced at 31, as more fully described in our above referenced pending application, are of a descending order of decreasing cross section from the outer end of sleeve 12C to its rounded inner end 21. The effect of this configuration (as in FIG. 5) is to distribute the applied axial load from the shank 14 of the rod end to a gradually increasing cross section in nipple 11 thereby increasing the axial (tensile) load carrying characteristics of the assembly. This is particularly advantageous when a fatigue or cycling load is applied to the rod assembly.

FIG. 7 shows a modified assembly wherein the crossed grooves 20 of the insert sleeve (e.g., sleeve 12B) are embodied integrally in the external surface of fitting shank 14D. The axial and torque locking connection between the shank 14D and the tube end nipple 11D are the same as in the locking connection between the insert sleeves 12, 12A and 12B of FIGS. 1–4 and the tube nipples 11, 11B of those figures. The tapered cross section of the swaged nipple 11D has the same improved axial strength and fatigue-resistant characteristics as the nipple 11B of FIG. 4.

In the rod end shank 14D, the metal defining grooves 20 is of harder material than the tube nipple 11D, so that the swaged nipple will be extruded into the grooves 20 while the latter remain substantially unchanged in cross-sectional configuration. The same is true of the grooves 20 in the insert sleeves 12, 12A, 12B above described.

We claim:

1. A tube end to rod end coupling comprising:
   a tube end;
   and a rod end having means of harder material defining crossed helical grooves of opposite hand in the external surface thereof;
   said tube end enclosing said rod end and being swaged into said grooves to provide axial and torque load holding coupling between the tube end and the rod end;
   said groove defining means having a frustoconical external surface of greater diameter at the outer end of said tube end than at the inner end of said means;
   said tube end being correspondingly of increasing cross-sectional area from its outer end to said inner end;
   and said groove-defining means consisting of a hardened sleeve of greater wall thickness at its outer end than at its inner end.

2. A coupling as defined in claim 1, wherein said rod end comprises a fitting having a threaded shank;
   wherein said sleeve has an internal thread mating with said threaded shank;
   and including locking means securing said sleeve to said fitting in nonrotatable relation thereto.

3. A coupling as defined in claim 1, wherein said groove-defining means has a rounded inner end lessening the development of fatigue failure in the mating portion of the tube end.

4. A coupling as defined in claim 1, wherein said grooves are of right-hand and left-hand pitch respectively, and have equal but opposite pitch, defining intersections of X form on opposite sides of the sleeve.

5. A coupling as defined in claim 4, wherein the pitch angle of said grooves, relative to the coupling axis, is of the order of 30°.

6. A coupling as defined in claim 1, wherein said grooves are of rounded cross section.

7. A coupling as defined in claim 1, wherein said groove-defining means has a frustoconical external surface of greater diameter at the outer end of said tube end than at the inner end of said means;
   and wherein said tube end is correspondingly of increasing cross-sectional area from its outer end to said inner end.

8. A tube end to rod end coupling comprising:
   a tube end;
   a rod end fitting having a shank provided with means, of greater hardness than said tube end, for locking said tube end to said shank in axially and rotationally fixed relation thereto, said means comprising a series of annular ribs separated axially by annular spaces, said ribs being of split ring form having circumferentially opposed ends spaced to define notches, said ribs being of progressively decreasing diameter from the outer end to the inner end of said series along the length of said sleeve;
   said tube end enclosing said means and being swaged into said annular spaces and into said notches so as to be interlocked with said sleeve both axially and rotationally, and being of increasing wall thickness from the outer to the inner end of said rib series, in its annular areas contiguous to said ribs;
   said locking means comprising a hardened insert sleeve having said ribs as integral external portions thereof;
   said sleeve being internally threaded and said shank being threaded thereinto;
   and means acting between said sleeve and said shank to lock said sleeve against rotation on said shank.

9. A coupling as defined in claim 8, wherein said tube end is of relatively soft metal.

* * * * *